(12) United States Patent
Jouppi

(10) Patent No.: US 7,643,064 B1
(45) Date of Patent: Jan. 5, 2010

(54) PREDICTIVE VIDEO DEVICE SYSTEM

(75) Inventor: Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 11/158,981

(22) Filed: Jun. 21, 2005

(51) Int. Cl.
*H04N 5/232* (2006.01)
*G05B 15/00* (2006.01)
*G05B 19/00* (2006.01)
*G05B 19/18* (2006.01)
*G06K 9/00* (2006.01)

(52) U.S. Cl. ............... 348/211.9; 700/254; 700/257; 700/259; 382/153

(58) Field of Classification Search ............ 348/14.01, 348/14.05, 169, 170, 171, 208.99, 208.3, 348/208.6, 208.12, 208.13, 208.14, 211.99, 348/211.9, 240.99, 240.1, 240.2; 382/103, 382/153; 700/259, 254, 257, 252; 901/47; 318/568.15

See application file for complete search history.

(56) References Cited

U.S. PATENT DOCUMENTS

| | | | | |
|---|---|---|---|---|
| 4,858,020 A | * | 8/1989 | Homma | 348/240.2 |
| 5,835,140 A | * | 11/1998 | Nakamura et al. | 348/211.12 |
| 6,323,898 B1 | * | 11/2001 | Koyanagi et al. | 348/169 |
| 6,545,708 B1 | * | 4/2003 | Tamayama et al. | 348/211.8 |
| 6,845,297 B2 | * | 1/2005 | Allard | 700/259 |
| 6,961,082 B2 | * | 11/2005 | Miura et al. | 348/211.9 |
| 7,057,643 B2 | * | 6/2006 | Iida et al. | 348/208.14 |
| 2001/0019355 A1 | * | 9/2001 | Koyanagi et al. | 348/36 |
| 2005/0089212 A1 | * | 4/2005 | Mashitani et al. | 382/154 |
| 2006/0187224 A1 | * | 8/2006 | Ehrlich | 345/522 |

* cited by examiner

*Primary Examiner*—Jason Whipkey

(57) ABSTRACT

A predictive device system includes a first device motion control input, determines a desired first device motion using the first device motion control input, and provides actual first device motion using the first device motion control input. The predictive system also determines motion inherent in a received signal using the actual first device motion, determines a difference to be simulated in a second device signal using the desired first device motion and the motion inherent in the received signal, and outputs a predictive signal using the first device motion control input and the difference to be simulated in the second device signal.

20 Claims, 3 Drawing Sheets

PREDICTIVE VIDEO DEVICE SYSTEM

BACKGROUND

1. Technical Field

The present invention relates generally to robotics and more specifically to telepresence systems.

2. Background Art

In the past, video camera and audio systems were developed for improving communication among individuals who are separated by distance and/or time. The systems and the process are now referred to as "videoconferencing". Videoconferencing sought to duplicate, to the maximum extent possible, the full range, level and intensity of interpersonal communication and information sharing which would occur if all the participants of a meeting were "face-to-face" in the same room at the same time.

In addition to spoken words, demonstrative gestures, and behavioral cues, face-to-face contact often involves sitting down, standing up, and moving around to look at objects or people. This combination of spoken words, gestures, visual cues, and physical movement significantly enhances the effectiveness of communication in a variety of contexts, such as "brainstorming" sessions among professionals in a particular field, consultations between one or more experts and one or more clients, sensitive business or political negotiations, and the like.

Behavioral scientists know that interpersonal communication involves a large number of subtle and complex visual cues, referred to by names like "gaze" and "eye contact," which provide additional information over and above the spoken words and explicit gestures. Gaze relates to others being able to see where a person is looking and eye contact relates to the gazes of two persons being directed at the eyes of the other. These cues are, for the most part, processed subconsciously by the people, and often communicate vital information.

In situations where all the people cannot be in the same place at the same time, the beneficial effects of face-to-face contact will be realized only to the extent that a remotely located person, or "user", can be "recreated" at the site of the meeting where the "participants" are present.

In robotic telepresence, a remotely controlled robot simulates the presence of the user. The overall experience for the user and the participants interacting with the robotic telepresence device is similar to videoconferencing, except that the user has a freedom of motion and control over the robot and video input that is not present in traditional videoconferencing. The robot platform typically includes a camera, a display device, a motorized platform that includes batteries, a control computer, and a wireless computer network connection. An image of the user is captured by a camera at the user's location and displayed on the robotic telepresence device's display at the meeting.

In video communication systems where moveable or zoomable video cameras at a remote location are under control of a local user, feedback delays can cause difficulties for users in adjusting to camera motion at the remote location. This motion may be of several types. As is present in many commercial video conferencing systems, a camera at the remote location could be panned, tilted, or zoomed by a person viewing the video remotely.

In other systems, the XY location of the camera may change with motion of the camera platform i.e., translation. A typical example of this is that the user may direct the camera to point to an object to the right of their current viewpoint. They may stop requesting the camera to move when they see the desired object centered on their video screen.

However, additional delays in the control loop can cause the actual position of the camera to overshoot the desired position of the camera. Sources of delays include: transmitting commands to the remote camera, the motion of the camera based on those commands, acquisition of video imagery, compression of the video, transmission of the video, decompression of the video, and rendering the video on a display device.

As more complex systems evolve, control of the remote positioning can become even more complex. The user navigates through a remote environment based on this video feedback. However, delays of several seconds can occur between user commands such as controlling speed via a pistol grip and the resulting change in video presentation for the user.

DISCLOSURE OF THE INVENTION

The present invention provides a predictive device system including providing a first device motion control input; determining a desired first device motion using the first device motion control input; providing actual first device motion using the first device motion control input; determining motion inherent in a received signal using the actual first device motion; determining a difference to be simulated in a second device signal using the desired first device motion and the motion inherent in the received signal; and outputting a predictive signal using the first device motion control input and the difference to be simulated in the second device signal.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
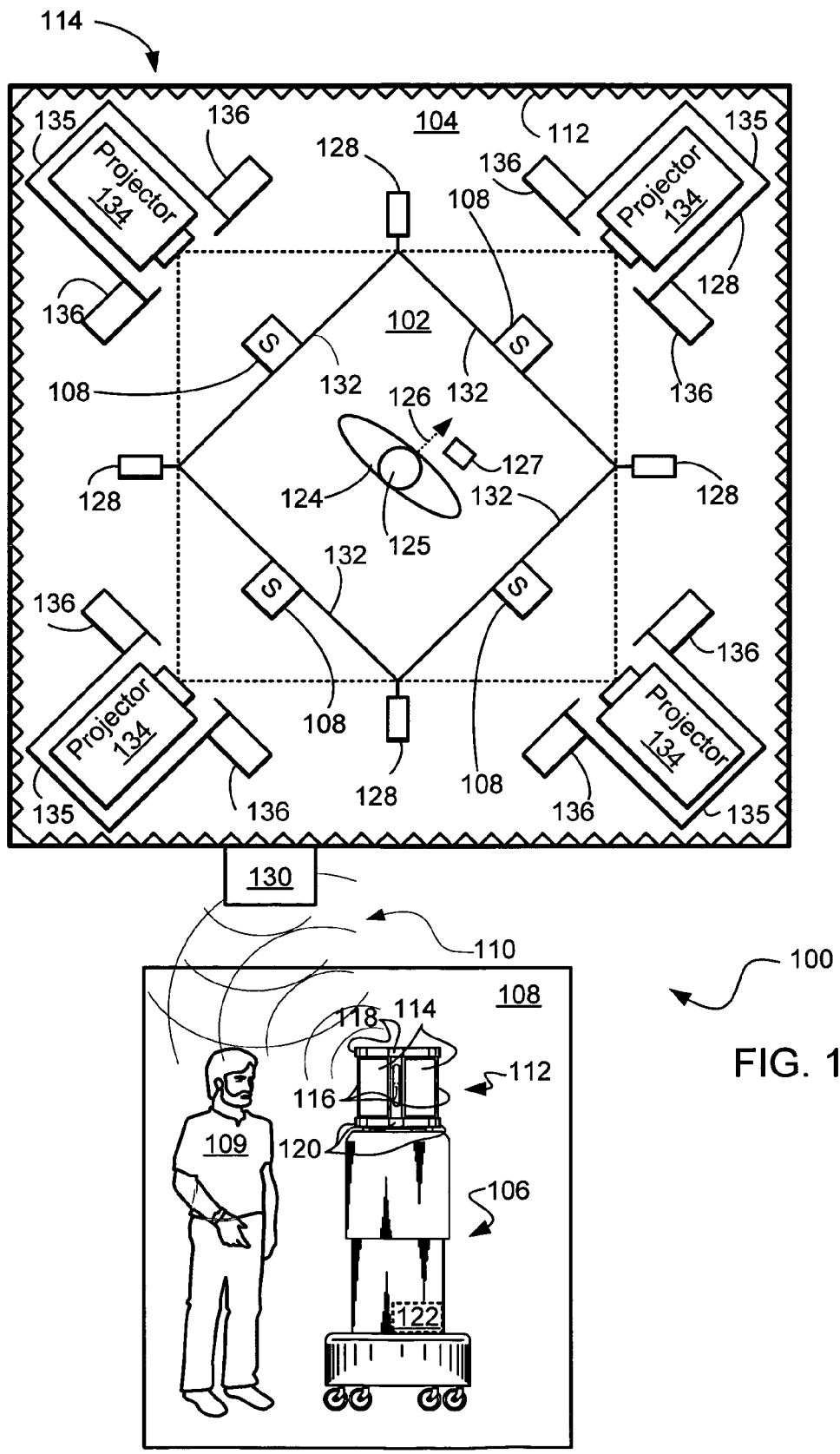
FIG. 1 shows a Mutually-Immersive Mobile Telepresence (E-Travel) System in accordance with an embodiment of the present invention.

The present invention relates to a Mutually-Immersive Mobile Telepresence (E-Travel) System. A user sits in a room showing the remote meeting location and a robot device is located at a remote meeting location. Video and audio are transmitted between the display and the robot device so that the user has the feeling of being present at the remote location by seeing it in a surround view, and the people or meeting participants at the remote location have the feeling that the user is present by panels showing images of the head of the user; i.e., the feeling of telepresence. The robot device may have a humanoid as well as a non-humanoid shape, and is referred to as a "surrogate".

For example, the user sits or stands inside a display cube, with rear-projection surfaces on the front, back, sides, and optionally the ceiling showing images of the surrogate's location. Since the goal is to be mutually immersive, full-size live color video images of the user centered on the user's head are acquired from all four sides of the user's location for transmission to the surrogate's location concurrent with projection of full-size live color video surround from the surrogate's location on the four sides of the display cube surrounding the user. The user can move about inside the display cube, so head tracking techniques are used to acquire pleasingly cropped color video images of the user's head in real time.

In video systems with acquisition controlled by the remote user, delays in the control loop are generally uncompensated and users must control the system with slow motions and short steps. This results in slow overall control, low control bandwidth, and excessive user involvement.

For example, one approach is "supervisory control", and this has been classically used in tele-operation systems. The idea is for a person to provide a high-level goal, and for the system to implement it with control loops at the remote location, which are not subject to feedback delays. As an example of this, the user could direct the camera to move 10 degrees to the right and a control computer at the remote location reads angle sensors associated with the camera motion and move the camera to effect a motion of 10 degrees to the right. However, where the user does not know a priori how much motion is required because it is dependent on what the user sees, the user must be actively in the control loop.

For example, another approach builds a 3D model of the system, and the model is displayed semi-transparently overlapping the real video imagery. As soon as the user specifies a motion, the model moves without delay and this is immediately shown to the user. This can allow a remote user to know relatively accurately what commands are required to reach out and touch an object with a robot hand while little or no motion has yet been accomplished with the real robot arm. The real robot arm would subsequently implement the command.

Note that this approach could also work in a telepresence situation if an accurate model of the remote location could be created down to the nuances of remote participant's facial expressions, position of the participant's strands of hair, etc. However, in a telepresence application such a detailed model is unlikely to ever be practical.

In the predictive system of the present invention, the local system knows the delay and motion control characteristics of the remote device. The delay characteristics could have static default values as well as dynamic values computed based on instrumentation of the current communication system characteristics.

When a command is given that results in motion at the remote location, the current image being displayed is immediately changed to model the effects of the motion having immediately taken place. Then, as the actual motion occurs at a later time, the effects of the motion are "unwound" as the actual motion becomes visible in the video stream.

For example, if the user commands a remote camera to move a fixed amount to the right, the video displayed to the user is immediately shifted to the right by the expected amount. Then, later as the received remote video begins to move to the right, the video is shifted less and less at the user's location until there is no additional shifting at the users location and the image is stable at the new location.

The present invention provides solutions to at least two significant issues that occur above. First, how must the video be processed to simulate motion before the video showing actual motion is received? Second, how can the synchronization between the position of the returned video and the local shifting (or in the general case, warping) be precisely maintained.

Referring now to FIG. 1, therein is shown a Mutually-Immersive Mobile Telepresence (E-Travel) System 100 in accordance with an embodiment of the present invention. The E-Travel System 100 includes a display cube 102 at a user's location 104 and a surrogate 106 at a remote location, a surrogate's location 108, where a meeting with one or more participants, such as a participant 109, is occurring. The surrogate 106 is connected to the display cube 102 via a high-speed communication network 110.

The surrogate 106 has a surrogate's head 112 including a number of surrogate's displays, such as four LCD panels, which make up a surrogate's displays 114. The surrogate's displays 114 are generally rectangular and have a center level midway up the displays.

One or more cameras, such as four surrogate's cameras 116, are positioned in the corners of the surrogate's head 112 horizontally level with the center level of the surrogate's displays 114. The surrogate's cameras 116 are at about eye level and to view and capture a 360° surround live video outwardly from the surrogate 106 at the surrogate's location 108 for display on the display cube 102.

One or more microphones, such as four directional surrogate's microphones 118, are positioned in the top corners of the surrogate's head 112 to capture sounds 3600 around the surrogate 106. One or more speakers, such as the four surrogate's speakers 120 are positioned in the bottom corners of the surrogate's head 112 to provide directional audio of the user's voice.

The surrogate 106 contains surrogate's computer/transceiver systems 122 for connecting to the surrogate's cameras 116 and the surrogate's microphones 118, processing data, and sending it to a user 124 in the display cube 102. The surrogate's computer/transceiver systems 122 also receive a live video view of the user's head 125, facing in a direction 126, from user's camera arrays 128 at the four corners of the display cube 102. The live video view is a 3600 view of the user's head 125. The four images of the user's head 125 are displayed on the surrogate's displays 114 in the surrogate's head 112 with the user's image facing in the direction 126.

The surrogate's computer/transceiver systems 122 also receive audio signals from the user 124, process them, and output them to the surrogate's speakers 120.

The surrogate 106 may be pushed around to different positions at the surrogate's location 108 or may be remotely controlled for movement and camera control by the user 124 using a control, such as a joystick control 127. The video from the surrogate's cameras 116 in the surrogate's head 112 are compressed and transmitted over the high-speed communication network 110 to user's computer/transceiver systems 130 at the user's location 104.

The video view from the surrogate's cameras 116 in the surrogate's head 112 is displayed on a display system, such as the walls of the display cube 102. In one embodiment, the display system is by way of a back projection onto projection screens 132 of the display cube 102 by four user's projectors 134. Where the participant 109 is directly in front of one of the surrogate's displays 114, the image of the participant 109 will be projected in the corners of two of the projection screens 132.

The user's projectors 134 are housed in "hush boxes 135" to make them virtually inaudible. The hush boxes 135 are built using sound isolation techniques familiar to those skilled in the state of the art. Each of the hush boxes 135 has a double-pane window for the projector light beam to shine out of the hush boxes 135 and onto the projection screen 132. Each of the hush boxes 135 also has measures for adequately cooling the user's projectors 134.

Adjacent the hush boxes 135 are near-infrared illuminators (NIRIs) 136 for providing light in the near-infrared portion of the spectrum for near-infrared cameras in the user's camera arrays 128.

User's speakers 108 are mounted above and below each of the projection screens 132. By driving each pair of user's speakers 108 with equal volume signals the sound appears to come from the center of each of the projection screens 132 to provide directional audio or hearing of one or more participants 109 from the four surrogate's microphones 118 on the surrogate 106.

The user's computer/transceiver systems 130, which can be placed in an adjacent room (for sound isolation purposes), drive the user's speakers 108 with audio information transmitted from the surrogate 106 at the surrogate's location 108. Anechoic foams 112 are (optionally) placed on walls 114 of the user's location 104. The anechoic foams 112 eliminate local reflections and permit the ambiance of the surrogate's location 108 to be recreated. Furthermore, by using black anechoic foams 112, stray reflection of light is reduced and the contrast on the projection screens 132 is increased.

The images of the meeting room on the projection screens 132 in the display cube 102 are presented "life size". This means that the angle subtended by objects on the projection screens 132 is roughly the same angle as if the user 124 were actually at the surrogate's location 108 viewing it personally. However, it will be understood that the reproduction is not exact unless the user's head is centered in the display cube 102. However, the present invention is still an improvement since images are not presented at "life size" in conventional videoconferencing systems.

As would be evident from the above disclosure, images on the projection screens 132 must be presented at life size in order for eye contact to be accurately preserved at more than one point. For example, if images are not presented at life size, a movement of the user's eyes by X degrees to the left will not be directed at objects X degrees to the left at the surrogate's location 108, for a given value of X (e.g., 30 degrees).

In the above, the display cube 102 has four sides so there are four surrogate's displays 114. If the display is not a cube, but has fewer or more sides, there will be a number of surrogate's displays equal to the number of sides.

Figure 2:
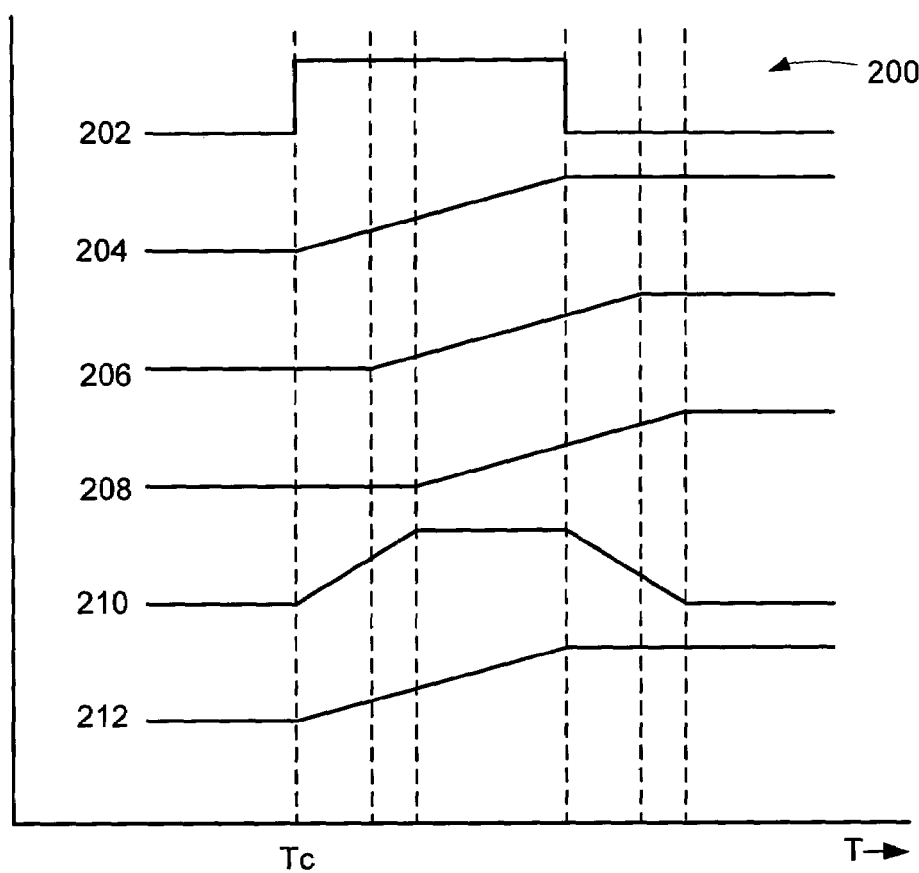
FIG. 2 shows a predictive synchronization chart in accordance with an embodiment of the present invention.

Referring now to FIG. 2, therein is shown a predictive video device system 200 in accordance with an embodiment of the present invention. The predictive video device system 200 includes a camera motion control input curve 202, a desired camera motion curve 204, an actual camera motion curve 206, a motion inherent in a received camera video curve 208, a difference to be simulated on a video display curve 210, and a predictive video display curve 212.

The predictive video device system 200 shows just an example for motion in one direction, but the general case covers multiple dimensions including zooming and translation. Further, it will be understood that the actual camera motion curve 206 is derived from angular motion sensors (e.g., potentiometers, position encoders, or tachometers), is assumed based on characterization of the camera motor mechanism and limit sensor data, or is determined from other sources.

In order to correctly know how much the motion of the remote camera curve 206 has affected the motion inherent in received video curve 208, the time of each video frame must be known relative to the user 124 of FIG. 1. This time code must be added to the video stream, or encoded in a parallel-synchronized channel in the high-speed communication network 110. This time code is used along with the time of the commands as well as the time the video is displayed for the user 124 to compute how much motion must be simulated by post processing at the user's location 104.

In order to do this accurately, there must exist synchronized clocks in the user's computer/transceiver systems 130 and in the surrogate's computer/transceiver systems 122 at the user's location 104 and the surrogate's location 108, respectively. There are many algorithms for synchronizing clocks that can be used to create a synchronized version of time from local independent clocks.

With synchronized clocks, the problem is conceptually to display, at a current time Tc, the latest video available but modified to simulate all prior commands given to the camera system, whether the prior commands have affected the video yet or not. The time code of the remote video must be stated in terms of the user's time so that its inherent visible motion can be known in terms of the motion commands previously given as well as the video display presentation.

In the predictive video device system 200, the user 124 moves the joystick control 127 from a neutral position signifying no motion to a hard forward position signifying a given motion for a remote camera for a number of seconds, and then immediately returns it to a neutral position as exemplified by the camera motion control input curve 202.

It is desired that the movements of the joystick control 127 cause immediate start and stop of the surrogate's camera 116 as exemplified by the desired camera motion curve 204.

However, the actual motion of the surrogate's camera 116 follows with some time delay, as exemplified by the actual camera motion curve 206.

The video received at the user's location 104 is delayed from the actual video at the surrogate's camera 116 by factors such as transmission delays, coding and decoding, etc. and would show movement after the surrogate's camera 116 has actually started and stopped. The motion inherent in the received camera video curve 208 exemplifies this.

The user's computer/transceiver systems 130 uses the information from the desired camera position curve 204 and the motion inherent in the received camera video curve 208 to determine the difference to be simulated in the video display curve 210.

There are several ways of simulating motion in a video stream, which depend of the type of motion being simulated as well as the characteristics of the system. The different types of motion include pan and tilt, zoom in and out, translation, and combinations of these motions.

The camera motion control input curve 202 and the difference to be simulated in the video curve 210 are used to create the predictive video display curve 212, which is outputted on the projection screen 132.

Figure 3:
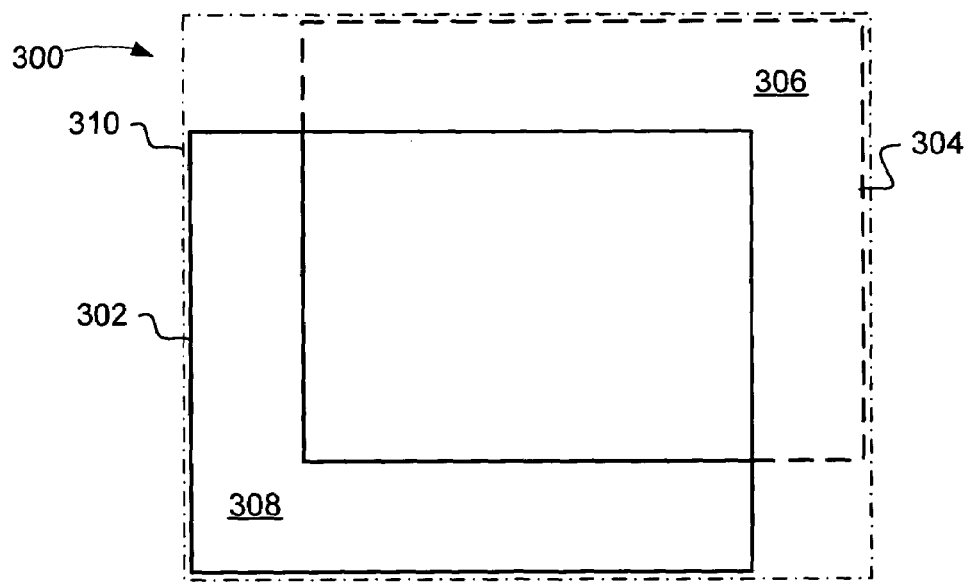
FIG. 3 shows an example of preserving horizontal gaze.

Referring now to FIG. 3, therein are shown systems 300 for simulating pan and tilt motions of the surrogate's cameras 116 of FIG. 1 in accordance with an embodiment of the present invention. Pan and tilt motions involve the video being skewed left or right, or moved up or down on the users display to simulate motion. The projection screen 132 is shown as a display image 302. A video image 304 is shown shifted up and to the right to simulate pan and tilt. This works well for space 306 on the side and top of the display that the video image 304 is being skewed towards, but raises the problem of what to do with space 308 on the side and bottom that the video image 304 is being skewed away from.

In the simplest embodiment, the missing video on the space 308 could just be left black, but this is not very attractive.

In other embodiments referred to as "texture extension", the last pixels at the edge of the video image 304 could be extended to the left from the left edge and down from the bottom edge to fill in the missing pixels (i.e. the texture clamp option) for the space 308.

In other embodiments other common texture extension options such as "mirror" could be used. The choice of texture options could also be made dependent on image analysis of a step of pixels around the affected edges of the video image 304.

The disadvantage of all the texture extension options is that they can create distracting artifacts for the user 124 since they are relatively simple approximations for unknown portions of the image. This could be extended by arbitrarily complex image analysis, but it would always result in deviations from the actual desired image (i.e., artifacts).

Figure 4:
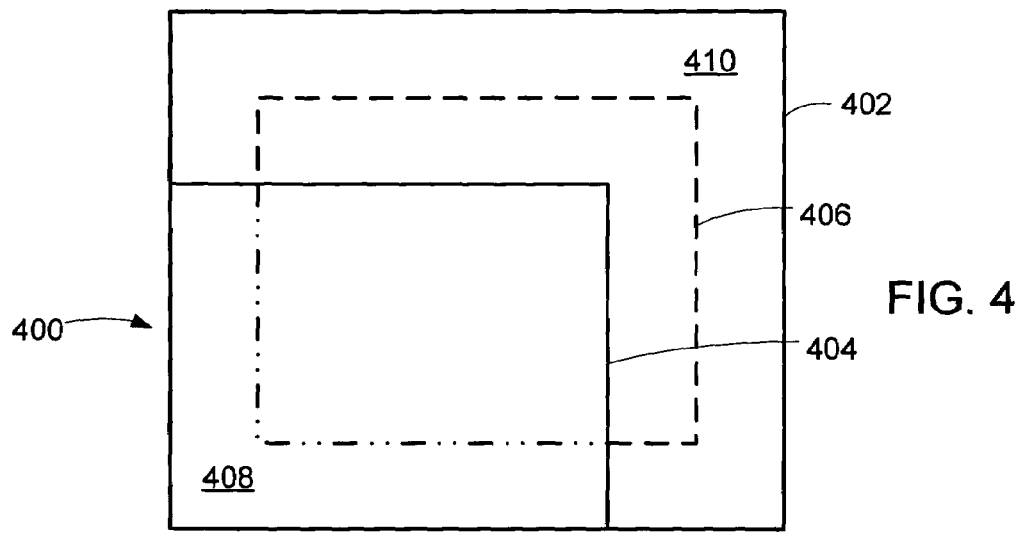
FIG. 4 shows another example of preserving horizontal gaze.

Referring now to FIG. 4, therein are shown systems 400 for simulating pan and tilt motions of the surrogate's cameras 116 of FIG. 1 in accordance with another embodiment of the present invention. One system is referred to as "guard ring" in which the field of view of an acquired image 402 is larger than that of a display image 404. In this case, panning and tilting of a video image 406 could display portions 408 of the video image 406 not usually displayed at the user's location 104 in order to simulate motion. In effect, this requires transmission of an extra guard band 410 around the display image 404. Today, the available video resolution and transmission bandwidth is quite limited, so it is undesirable to waste resolution by throwing some of the acquired image away at the users location. However, as video imager size continues to increase and network bandwidths improve this will become a more attractive option in the future.

Various combinations of texture extension and black as well as not compensating for some amount of the motion may be used in combination of the guard ring. This can minimize the size of the required guard ring and hence the area of the video imager and transmission bandwidth that is wasted.

Figure 5:
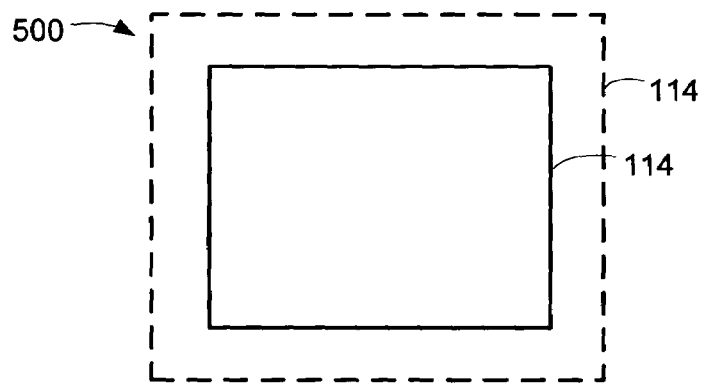
FIG. 5 show an example of preserving vertical gaze.

Referring now to FIG. 5, therein is shown systems 500 for simulating zoom in and out of the surrogate's cameras 116 of FIG. 1. The each of the surrogate's cameras 116 may have a zoom lens under user control. The remote operation of the zoom lens can have the same feedback delay problems as pan and tilt. The projection screen 132 is shown as a display image 502.

In the case of zooming in, a video image 504 can be expanded (i.e., magnified) on the display image 502 without the generation of any missing image areas but providing lower resolution. Zooming out (i.e., minimizing) creates a missing image problem. Various combinations of texture extension and black as well as not compensating for some amount of the motion may be used in combination of the guard ring.

The effects of translation of the surrogate's cameras 116 due to translation of the surrogate 106 in space vary depending on the angle between the direction of translation and the direction that the surrogate's cameras 116 are pointed. For example, translation in the direction of its orientation is similar to zooming in, and can be simulated as such. While simulating translation in the direction the camera is pointing by magnification does not properly give perspective changes away from the optical axis, this is a negligible secondary effect for the range of compensation involved in the E-Travel System 100.

Similarly, motion away from the direction the camera is pointed is can be effectively simulated using the techniques for zooming out. If the translation is perpendicular to the direction the camera is pointed, this can be simulated effectively with the same techniques used for panning the camera to the left or right.

All the above techniques to compensate for the effects of panning, tilting, zooming, and translation can all be combined to provide predictive video for a simultaneous combination of desired motions.

Motion of the surrogate 106 through space at the surrogate's location 108 results in a range of compensations required over the 360° field of view presented to the user 124 in the display cube 102. Thus, if the user 124 is directing the surrogate 106 to move forward, imagery displayed in front of the user 124 must be compensated as if zoomed in while imagery behind the user 124 must be compensated as if zoomed out, and imagery to the sides of the user 124 compensated as if panned. Because the surrogate 106 may move in an arbitrary direction in relation to the display cube 102, various parts of the 3600 surround video must experience variable amounts of zoom or panning depending on their radial position and the desired movement of the surrogate. Furthermore, these operations must be reasonably accurate since the video streams should seamed together with minimal artifacts in the corners of the display cube 102.

Figure 6:
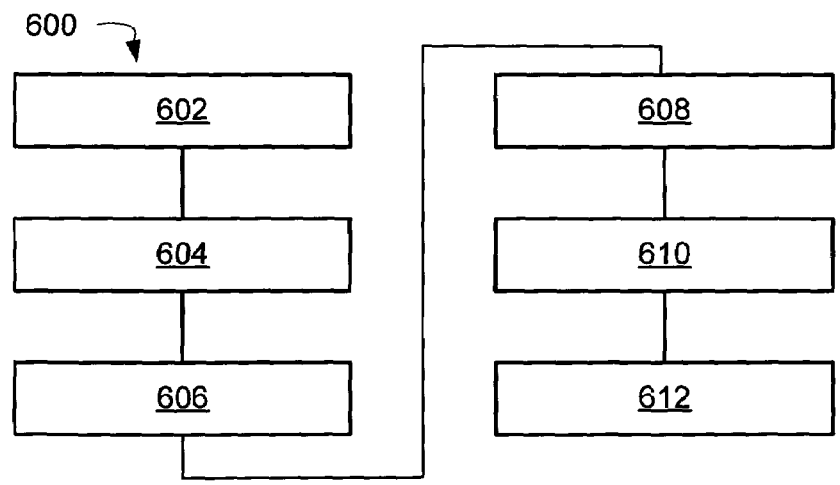
FIG. 6 shows a telepresencing method in accordance with the present invention.

Referring now to FIG. 6, therein is shown a predictive device system 600 in accordance with an embodiment of the present invention. The method 600 includes: providing a first device motion control input in a block 602; determining a desired first device motion using the first device motion control input in a block 604; providing actual first device motion using the first device motion control input in a block 606; determining motion inherent in a received signal using the actual first device motion in a block 608; determining a difference to be simulated in a second device signal using the desired first device motion and the motion inherent in the received signal in a block 610; and outputting a predictive signal using the first device motion control input and the difference to be simulated in the second device signal in a block 612.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hithertofore set forth herein or shown in the accompanying drawings are to be interpreted in an illustrative and non-limiting sense.

The invention claimed is:

1. A method for videoconferencing in a mutually-immersive mobile telepresence system having a surrogate and a display cube, the method comprising:

receiving a first device motion control input to move a camera position of the surrogate during a videoconference;

determining a desired first device motion using the first device motion control input;

providing actual first device motion using the first device motion control input;

determining motion inherent in a received signal using the actual first device motion;

determining a difference to be simulated in a second device signal at the display cube using the desired first device motion and the motion inherent in the received signal; and outputting a predictive signal on a screen at the display cube during the videoconference using the first device motion control input and the difference to be simulated in the second device signal.

2. The method as claimed in claim 1 further comprising, displaying the predictive signal on plural screens in the display cube.

3. The method as claimed in claim 1 further comprising, controlling movement of a camera of the surrogate from the display cube.

4. The method as claimed in claim 1 further comprising:
providing a second device receptive to the second device signal;
using the predictive signal to simulate action in the second device; and
determining a difference between the second device signal and the predictive signal on the second device; and
processing the predictive signal to be larger than signals on the second device.

5. The method as claimed in claim 1 further comprising:
outputting a plurality of predictive signals;
providing a plurality of second devices receptive to a plurality of second device signals that include the second device signal;
using the plurality of predictive signals to simulate action in the plurality of second devices; and
providing a range of compensations for the plurality of second device signals to seam the plurality of second device signals together.

6. A method for videoconferencing in a mutually-immersive mobile telepresence system having a robotic device and a display cube, the method comprising:
providing a camera motion control input from the display cube during a videoconference;
determining a desired camera motion, on the robotic device at a remote location from the display cube, using the camera motion control input;
providing actual camera motion on the robotic device using the camera motion control input;
determining motion inherent in a received video signal using the actual camera motion;
determining a difference to be simulated in a display video signal using the desired camera motion and the motion inherent in the received video signal; and
outputting a predictive video display on a screen at the display cube during the videoconference using the camera motion control input and the difference to be simulated in the display video signal.

7. The method as claimed in claim 6 further comprising, projecting the predictive video display on plural screens located on walls of the display cube.

8. The method as claimed in claim 6 further comprising:
providing a display system;
simulating pan, tilt, zooming out, and translation camera motions by skewing and vertically moving the predictive video display; and
processing space between a display on the display system and the predictive video display by texture extension.

9. The method as claimed in claim 6 further comprising:
providing a display system;
simulating pan, tilt, zooming out, and translation camera motions by skewing and vertically moving the predictive video display; and
processing the predictive video display to be larger than a display on the display system to provide a guard ring.

10. The method as claimed in claim 6 further comprising:
outputting a plurality of predictive video displays from a plurality of cameras;
providing a plurality of display systems;
simulating pan, tilt, zooming out, and translation camera motions by skewing and vertically moving the plurality of predictive video displays; and
providing a range of compensations for the plurality of predictive video displays on the plurality of display systems to seam the plurality of display systems together.

11. A predictive device system for videoconferencing comprising:
a display cube including a screen and a first device that:
controls movement of a camera on a robotic device that is remote from the display cube during a videoconference;
provides a first device motion control input, and provides actual first device motion using the first device motion control input;
a computer system that:
determines a desired first device motion using the first device motion control input,
determines motion inherent in a received signal using the actual first device motion,
determines a difference to be simulated in a second device signal using the desired first device motion and the motion inherent in the received signal, and
outputs a predictive signal on the screen at the display cube during the videoconference using the first device motion control input and the difference to be simulated in the second device signal.

12. The system as claimed in claim 11 further comprising:
a second device receptive to the second device signal for using the predictive signal to simulate action in the second device; and
the computer system for:
determining a difference between the second device signal and the predictive signal, and
processing the difference to provide an indication of the difference.

13. The system as claimed in claim 11 further comprising:
a second device receptive to the second device signal for using the predictive signal to simulate action in the second device; and
the computer system for:
determining a difference between the second device signal and the predictive signal on the second device, and
processing the predictive signal to change the predictive signal to remove the difference.

14. The system as claimed in claim 11 further comprising:
a second device receptive to the second device signal for using the predictive signal to simulate action in the second device; and
the computer system for:
determining a difference between the second device signal and the predictive signal on the second device, and
processing the predictive signal to be larger than a signal for the second device.

15. The system as claimed in claim 11 wherein:
the computer system is for outputting a plurality of predictive signals;
a plurality of second devices receptive to a plurality of second device signals;
the computer system for:
using the plurality of predictive signals to simulate action in the plurality of second devices; and
providing a range of compensations for the plurality of predictive signals to seam the plurality of predictive signals together for the plurality of second devices.

16. The system as claimed in claim 11 wherein:

the first device is for:

providing a camera motion control input, and providing actual camera motion using the camera motion control input;

the computer system is for:

determining a desired camera motion using the camera motion control input, determining motion inherent in a received video signal using the actual camera motion, determining a difference to be simulated in a display video signal using the desired camera motion and the motion inherent in the received video signal, and outputting a predictive video display using the camera motion control input and the difference to be simulated in the display video signal.

17. The system as claimed in claim 16 further comprising:

a display system;

the computer system is for:

simulating pan, tilt, zooming out, and translation camera motions by skewing and vertically moving the predictive video display, and processing space between a display on the display system and the predictive video display by coloring the space.

18. The system as claimed in claim 16 further comprising:

a display system;

the computer system is for:

simulating pan, tilt, zooming out, and translation camera motions by skewing and vertically moving the predictive video display, and processing space between a display on the display system and the predictive video display by texture extension.

19. The system as claimed in claim 16 further comprising:

a display system;

the computer system is for:

simulating pan, tilt, zooming out, and translation camera motions by skewing and vertically moving the predictive video display, and processing the predictive video display to be larger than a display on the display system to provide a guard ring.

20. The system as claimed in claim 16 further comprising:

a plurality of cameras for providing surround live video;

a plurality of display systems;

the computer system for:

simulating pan, tilt, zooming out, and translation camera motions by skewing and vertically moving a plurality of predictive video displays, and providing a range of compensations for the plurality of predictive video displays on the plurality of display systems to seam the plurality of display systems together.

* * * * *